(12) United States Patent
Nagumo

(10) Patent No.: US 10,345,690 B2
(45) Date of Patent: Jul. 9, 2019

(54) OPTICAL APPARATUS AND PROJECTOR

(71) Applicant: SEIKO EPSON CORPORATION, Tokyo (JP)

(72) Inventor: Toshihiko Nagumo, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/640,836

(22) Filed: Jul. 3, 2017

(65) Prior Publication Data
US 2018/0017857 A1 Jan. 18, 2018

(30) Foreign Application Priority Data
Jul. 14, 2016 (JP) .................................. 2016-139150

(51) Int. Cl.
*G03B 21/14* (2006.01)
*G03B 33/12* (2006.01)
*H04N 9/31* (2006.01)
*G02B 7/00* (2006.01)
*G03B 21/00* (2006.01)

(52) U.S. Cl.
CPC ............ *G03B 33/12* (2013.01); *G03B 21/14* (2013.01); *G03B 21/142* (2013.01); *G03B 21/145* (2013.01); *H04N 9/3105* (2013.01); *H04N 9/3167* (2013.01); *G02B 7/003* (2013.01); *G03B 21/006* (2013.01)

(58) Field of Classification Search
CPC ........ G03B 21/14; G03B 21/20; G03B 33/12; G03B 21/00; G02B 5/30; G02B 7/00; G02F 1/13
See application file for complete search history.

(56) References Cited

U.S. PATENT DOCUMENTS

| 2004/0233548 | A1* | 11/2004 | Uehara | H04N 9/3105 |
| | | | | 359/819 |
| 2013/0002971 | A1* | 1/2013 | Kadotani | G02B 27/102 |
| | | | | 349/5 |
| 2015/0277218 | A1* | 10/2015 | Nagatsu | H04N 9/3105 |
| | | | | 349/5 |

FOREIGN PATENT DOCUMENTS

| JP | 2010-128225 A | 6/2010 |
| JP | 2015-194684 A | 11/2015 |

* cited by examiner

*Primary Examiner* — Cara E Rakowski
*Assistant Examiner* — Danell L Owens
(74) *Attorney, Agent, or Firm* — Oliff PLC

(57) ABSTRACT

An optical apparatus including a light combining optical apparatus that combines color light fluxes modulated by a first and a second light modulators with each other includes an inorganic polarizer disposed on the light exiting side of the first light modulator, a transparent substrate that is in contact with the inorganic polarizer and transmits light, a supporting section that supports the first light modulator and is attached to the light combining optical apparatus, and a clamping section that clamps, along with the supporting section, the inorganic polarizer and the transparent substrate. The clamping section includes a engaging section that engages with the supporting section and an urging section that urges the inorganic polarizer toward the transparent substrate when the engaging section engages with the supporting section, and the supporting section has a receiving section that receives the transparent substrate pressed by the urging section.

10 Claims, 9 Drawing Sheets

OPTICAL APPARATUS AND PROJECTOR

BACKGROUND

1. Technical Field

The present invention relates to an optical apparatus and a projector.

2. Related Art

There is a known projector of related art including a light source, a liquid crystal panel that modulates light emitted from the light source, and a projection optical apparatus that projects the modulated light. In recent years, it is desired to project an image having increased luminance, and there is a known projector that incorporates a light source that emits high-luminous-flux light. Since a thermal burden on a polarizer disposed on the light exiting side of the liquid crystal panel (light-exiting-side polarizer) increases as the trend toward high luminous flux and high luminance advances, a projector (projection-type liquid crystal display apparatus) including an optical unit that allows dissipation of heat generated in the polarizer has been proposed (see JP-A-2010-128225, for example).

The optical unit described in JP-A-2010-128225 has a configuration in which a polarizing glass plate including no glass layer but formed only of a reducing layer is bonded as the light-exiting-side polarizer to a light transmissive substrate having thermal conductivity higher than that of a glass substrate with an inorganic adhesive.

The technology described in JP-A-2010-128225, which is based on the configuration in which an adhesive is present on the optical path, however, could undesirably result in unintended refraction and other optical behavior due to the adhesive and hence degradation in the quality of an image. Further, if the amount of applied adhesive is not adequately managed, the polarizing glass plate and the light transmissive substrate cannot be reliably fixed to each other, resulting in further degradation in the quality of an image could be further degraded, and the manufacture of the optical unit is complicated.

SUMMARY

An advantage of some aspects of the invention is to solve at least a part of the problems described above, and the invention can be implemented as the following forms or application examples

Application Example 1

An optical apparatus according to this application example includes a first light modulator that modulates first color light, a second light modulator that modulates second color light, and a light combining optical apparatus that combines color light fluxes modulated by the first and second light modulators with each other, the optical apparatus including an inorganic polarizer disposed on a light exiting side of the first light modulator, a transparent substrate that is in contact with the inorganic polarizer and transmits light, a supporting section that supports the first light modulator and is attached to the light combining optical apparatus, and a clamping section that clamps, along with the supporting section, the inorganic polarizer and the transparent substrate. The clamping section includes an engaging section that engages with the supporting section and an urging section that urges one of the inorganic polarizer and the transparent substrate toward the other one of the inorganic polarizer and the transparent substrate when the engaging section engages with the supporting section, and the supporting section has a receiving section that receives the other one of the inorganic polarizer and the transparent substrate pressed by the urging section.

According to the configuration described above, the inorganic polarizer and the transparent substrate are clamped between the urging section and the receiving section when the clamping section engages with the supporting section. That is, the supporting section, which supports the first light modulator, can be used to maintain the state in which the inorganic polarizer is in contact with the transparent substrate. The configuration in which the inorganic polarizer is in contact with the transparent substrate can therefore be achieved with use of no adhesive and an increase in the number of parts suppressed. An optical apparatus that can be readily manufactured and allows dissipation of heat in the inorganic polarizers, which generate heat when the color light is incident thereon, can therefore be provided. In particular, a remarkable effect is exerted in a configuration in which high-luminance color light is incident.

Application Example 2

In the optical apparatus according to the application example described above, it is preferable the inorganic polarizer is formed in a rectangular shape in a plan view, that a direction extending along one edge of the inorganic polarizer is called a first direction, and a direction that intersects the first direction and extends along a surface of the inorganic polarizer is called a second direction, and that the clamping section has a first plate-shaped section extending along an end surface that is a surface of one of the inorganic polarizer and the transparent substrate and faces in the second direction.

Application Example 3

In the optical apparatus according to the application example described above, the clamping section preferably has a pair of second plate-shaped sections that bend at opposite ends of the first plate-shaped section that are located along the first direction and restrict movement of the inorganic polarizer and the transparent substrate in the first direction.

Application Example 4

In the optical apparatus according to the application example described above, it is preferable that the urging section has a pair of urging sections extending in the first direction in such a way that the pair of urging sections approach each other, and that the pair of urging sections are bent portions of the pair of second plate-shaped sections.

According to the configuration described above, the inorganic polarizer and the transparent substrate are clamped by the supporting section and the clamping section having the pair of urging sections. The inorganic polarizer and the transparent substrate can therefore be so clamped that the pair of urging sections clamping sections in the vicinity of the four corners of the inorganic polarizer and the transparent substrate, that is, the inorganic polarizer and the transparent substrate are allowed to be in contact with each other over a wide area, whereby the heat in the inorganic polarizer can be efficiently dissipated.

According to the configuration described above, the inorganic polarizer and the transparent substrate are so supported that the opposite sides thereof in the second direction are supported by the first plate-shaped section of the clamping section and the opposite sides thereof in the first direction are supported by the second plate-shaped sections of clamping section. The first plate-shaped section, the second plate-shaped sections, and the urging sections can be integrally formed, for example, of a metal sheet. Therefore, the inorganic polarizer and the transparent substrate can be supported in the in-plane direction (first and second directions) and one of the inorganic polarizer and the transparent substrate can be urged toward the other by using simple parts.

Application Example 5

In the optical apparatus according to the application example described above, it is preferable that the clamping section has a third plate-shaped section so disposed as to face the first plate-shaped section with a predetermined gap therebetween and as to be connected to the first plate-shaped section, that the engaging section has a bent section that is provided at a front end of the third plate-shaped section and bends toward the first plate-shaped section, that the supporting section has a base section attached to the light combining optical apparatus and a protruding section that protrudes from the base section and is inserted into a space between the first plate-shaped section and the third plate-shaped section, that an insertion hole with which the bent section engage is formed in the protruding section, that the receiving section is provided on a side facing the base section with respect to the inorganic polarizer and the transparent substrate, and that the urging section is provided on a side opposite the base section with respect to the inorganic polarizer and the transparent substrate.

According to the configuration described above, the clamping section can be caused to engage with the supporting section and the inorganic polarizer and the transparent substrate can be clamped by simply disposing the clamping section on opposite sides of the inorganic polarizer and the transparent substrate and inserting the protruding section into the space between the first plate-shaped section and the third plate-shaped sections. Manufacture of a unit including the supporting section and the clamping section with the inorganic polarizer and the transparent substrate clamped can therefore be simplified. The unit described above can be so configured that the amount of the supporting section and the clamping section jutting out beyond the inorganic polarizer and the transparent substrate in the second direction is small, whereby the size of the unit in the second direction can be reduced. The size of optical apparatus can therefore be reduced.

Application Example 6

In the optical apparatus according to the application example described above, it is preferable that the supporting section has a first supporting section that supports the first light modulator with play therebetween, and that the first light modulator and the first supporting section are fixed to each other via a fixing member.

According to the configuration described above, the supporting section attached to the light combining optical apparatus has the first supporting section described above, and the optical apparatus includes the fixing member. The position of the first light modulator supported by the first supporting section with play therebetween can therefore be adjusted, and the fixing member can fix the position of the first light modulator. The position of the pixels provided in the first light modulator can therefore be adjusted, whereby the optical apparatus can output light having suppressed pixel shift.

Application Example 7

In the optical apparatus according to the application example described above, it is preferable that the inorganic polarizer has a base member and a wire-grid layer formed on one surface of the base member, with the wire-gird layer and the first light modulator so disposed as to face each other, and that the transparent substrate is in contact with a side of the inorganic polarizer that is opposite a side where the wire-gird layer is present.

According to the configuration described above, the light outputted from the first light modulator is directly incident on the wire-grid layer. The amount of refraction and other optical behavior of the light outputted from the first light modulator that occur until the light reaches the wire-gird layer can be reduced as compared with a configuration in which a member is disposed between the first light modulator and the wire-grid layer (a configuration in which the light is incident through the side opposite the wire-grid layer and a configuration in which the light passes through the transparent substrate and the inorganic polarizer in this order). The optical apparatus can therefore output light having suppressed color unevenness and other disadvantages.

Application Example 8

The optical apparatus according to the application example described above preferably further includes an optical element disposed on a light exiting side of the inorganic polarizer, and it is preferable that the supporting section has a second supporting section provided between the optical element and the inorganic polarizer, and that the second supporting section has the receiving section.

According to the configuration described above, the optical apparatus includes an optical element (for example, element that compensates optical retardation, a retardation film, and other optical elements), and the second supporting section that supports the optical element includes the receiving section. The configuration described above can provide an optical apparatus that outputs light that excels in the contrast ratio, characteristics of the angular field of view, and other factors while maintaining the configuration in which the inorganic polarizer and the transparent substrate are clamped.

Application Example 9

In the optical apparatus according to the application example described above, it is preferably that the inorganic polarizer has a rectangular shape in a plan view, that a direction extending along one edge of the inorganic polarizer is called a first direction, and a direction that intersects the first direction and extends along a surface of the inorganic polarizer is called a second direction, and that the clamping section has a pair of clamping sections s provided on a side facing the one edge and on a side facing another edge separate from the one edge in the second direction.

Application Example 10

A projector according to this application example includes a light source, the optical apparatus according to any of the application examples described above on which light emitted from the light, source is incident, and a projection optical apparatus that projects light outputted from the optical apparatus.

According to the configuration described above, the projector, which includes the optical apparatus described above, can project a bright, high-quality image, and the size of the projector can be reduced.

BRIEF DESCRIPTION OF THE DRAWINGS

The invention will be described with reference to the accompanying drawings, wherein like numbers reference like elements.

DESCRIPTION OF EXEMPLARY EMBODIMENTS

A projector according to an embodiment of the invention will be described below with reference to the drawings.

The projector according to the present embodiment modulates light emitted from a light source in accordance with image information and enlarges and projects the modulated light on a projection surface such as a screen.
Key Configuration of Projector FIG. 1 is a diagrammatic view showing a schematic configuration of a projector 1 according to the present embodiment.

Figure 1:
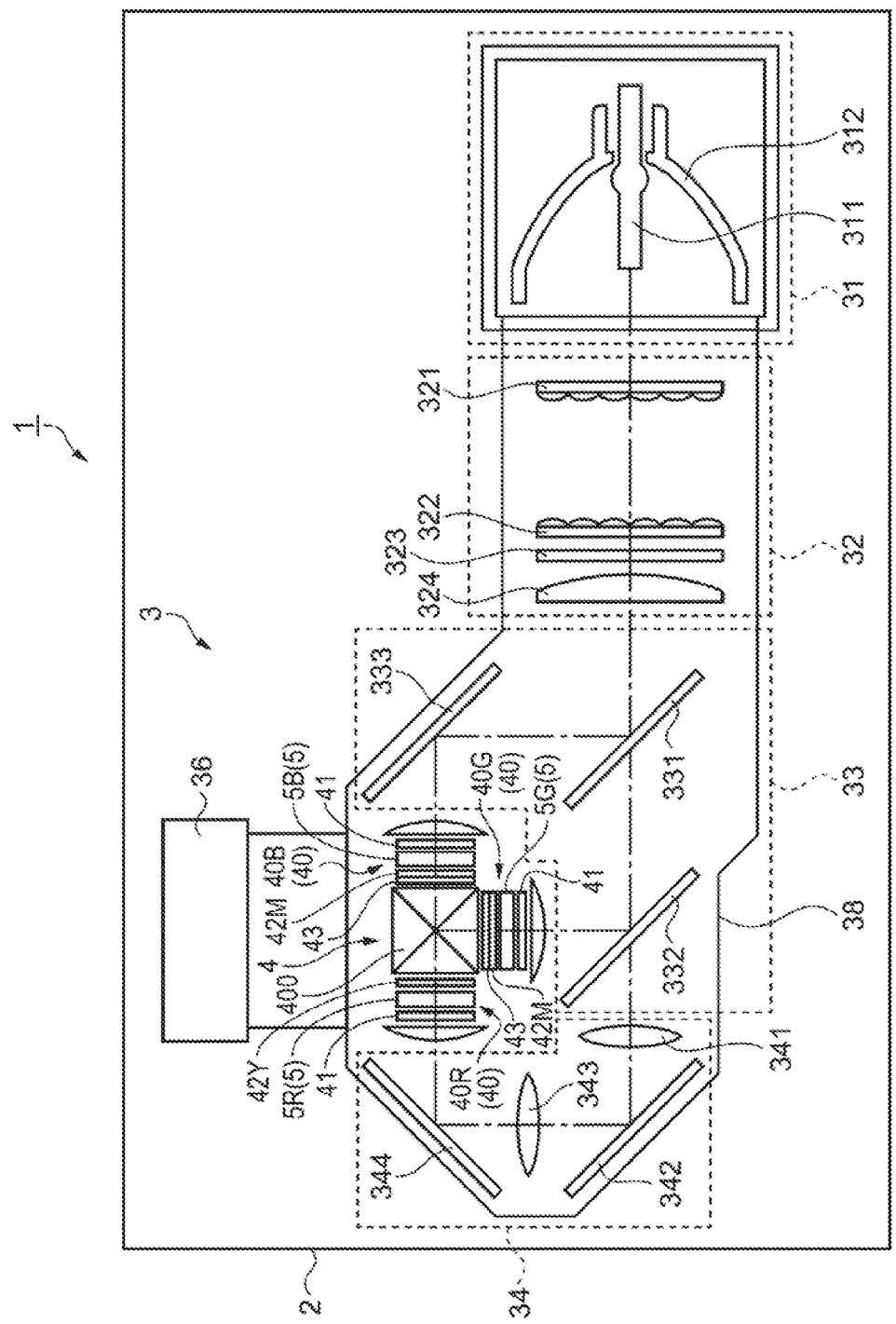
FIG. 1 is a diagrammatic view showing a schematic configuration of a projector according to an embodiment of the invention.

The projector 1 includes an exterior enclosure 2, which forms the exterior of the projector 1, a controller (not shown), and an optical unit 3, which includes a light source apparatus 31, as shown in FIG. 1. Although not shown, a cooler that cools the optical unit 3 and other components, a power supply that supplies the light source apparatus 31 and the controller with electric power, and other components are disposed in the exterior enclosure 2.

The exterior enclosure 2, although not described in detail, is a combination of a plurality of members made of a synthetic resin and other components. The exterior enclosure 2 is provided with an air intake port through which outside air is taken in, an air exhaust port through which heated air in the exterior enclosure 2 is exhausted out thereof (neither of the ports is shown), and other components.

The controller includes a CPU (central processing unit), a ROM (read only memory), a RAM (random access memory), and other components so that the controller functions as a computer, and the controller controls the action of the projector 1, for example, controls image projection.

The optical unit 3 optically processes light outputted from the light source apparatus 31 and projects the processed light under the control of the controller.

The optical unit 3 includes, in addition to the light source apparatus 31, an optical integration illumination system 32, a color separation system 33, a relay system 34, an optical apparatus 4, a projection lens 36 as a projection optical apparatus, and an optical part enclosure 38, which arranges the members described above in predetermined positions along the optical path, as shown in FIG. 1.

The light source apparatus 31 includes a discharge-type light source 311 formed, for example, of an ultrahigh-pressure mercury lamp or a metal halide lamp, a reflector 312, other components, and light emitted from the light source 311 is reflected off the reflector 312 and directed toward the optical integration illumination system 32.

The optical integration illumination system 32 includes a first lens array 321, a second lens array 322, a polarization conversion element 323, and a superimposing lens 324. The first lens array 321, the second lens array 322, and the superimposing lens 324 divide the light outputted from the light source apparatus 31 into a plurality of sub-light fluxes and cause the sub-light fluxes to be roughly superimposed on one another or a pixel area (not shown) of each light modulator (liquid crystal panel 51 (see FIG. 3)), which will be described later. The polarization conversion element 323 aligns randomly polarized light fluxes having exited out of the second lens array 322 with one another into roughly one type of polarized light that can be used by the liquid crystal panels 51.

The color separation system 33 includes two dichroic mirrors 331 and 332 and a reflection mirror 333 and separates the light having exited out of the optical integration illumination system 32 into three color light fluxes, first color light (blue light, hereinafter referred to as "B light"), second color light (green light, hereinafter referred to as "G light"), and third color light (red light, hereinafter referred to as "R light")

The relay system 34 includes alight-incident-side lens 341, a relay lens 343, and reflection mirrors 342 and 344 and has a function of guiding the R light separated by the color separation system 33 to the light modulator 5 (liquid crystal panel 51) for R light. The optical unit 3 has a configuration in which the relay system 34 guides the R light, but not necessarily, and the optical unit 3 may have a configuration in which the relay system 34 guides, for example, the B light.

Figure 2:
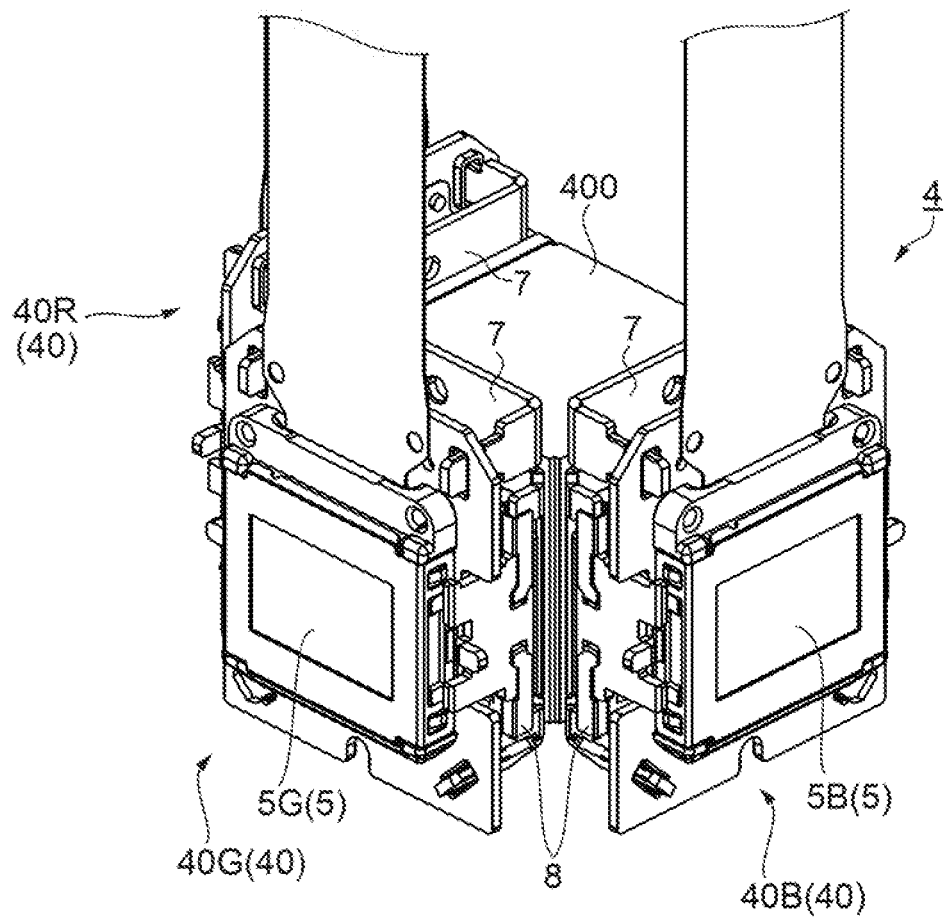
FIG. 2 is a perspective view of an optical apparatus in the embodiment.

FIG. 2 is a perspective view of the optical apparatus 4.

The optical apparatus 4 includes electro-optical devices 40 provided for the respective color light fluxes (reference character 40B denotes electro-optical device for first color light, reference character 40G denotes electro-optical device for second color light, and reference character 40R denotes electro-optical device for third color light) and a cross dichroic prism 400 as a light combining optical apparatus, as shown in FIGS. 1 and 2

Figure 3:
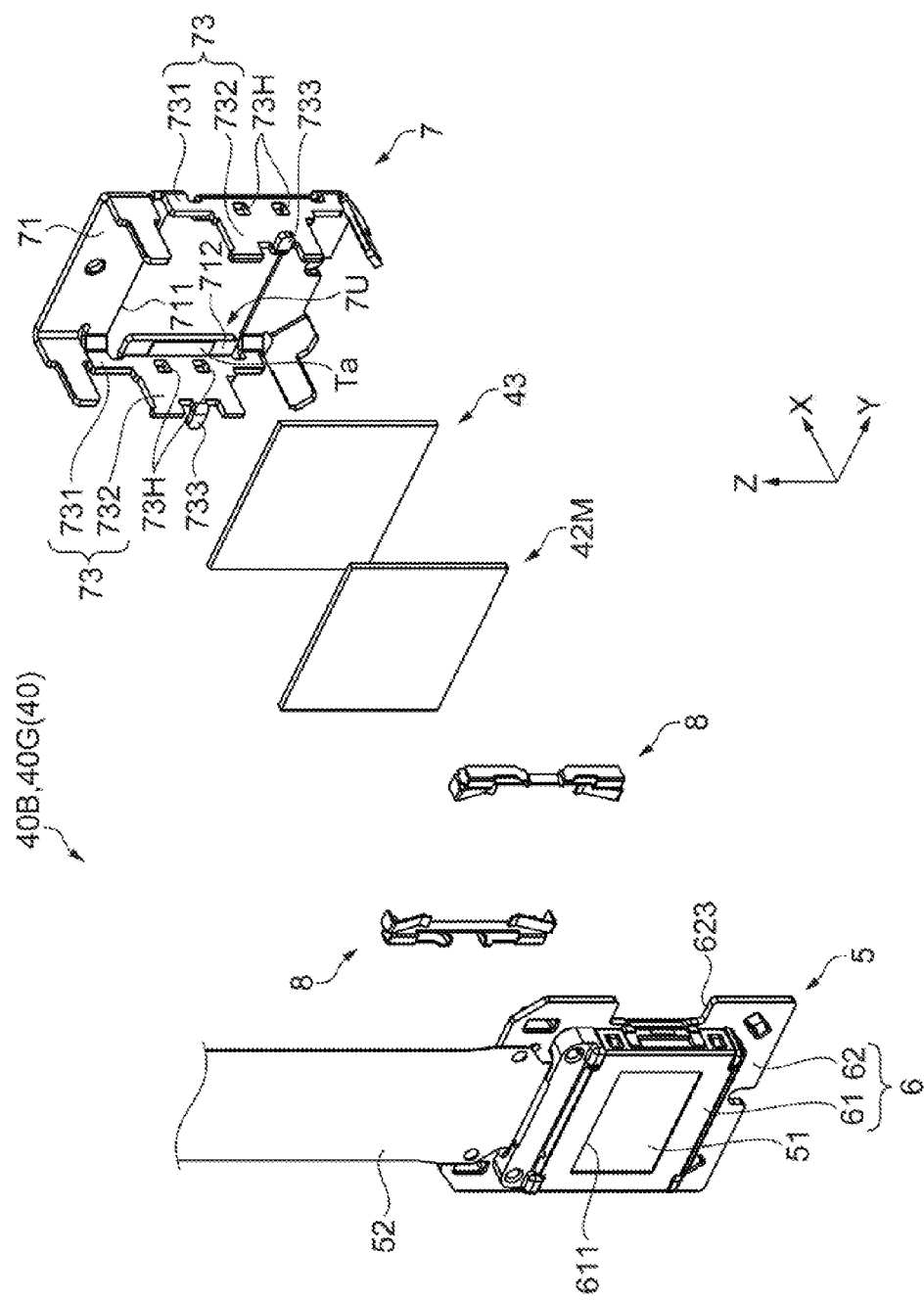
FIG. 3 is an exploded perspective view of an electro-optical device in the embodiment viewed from the light incident side.
Figure 4:
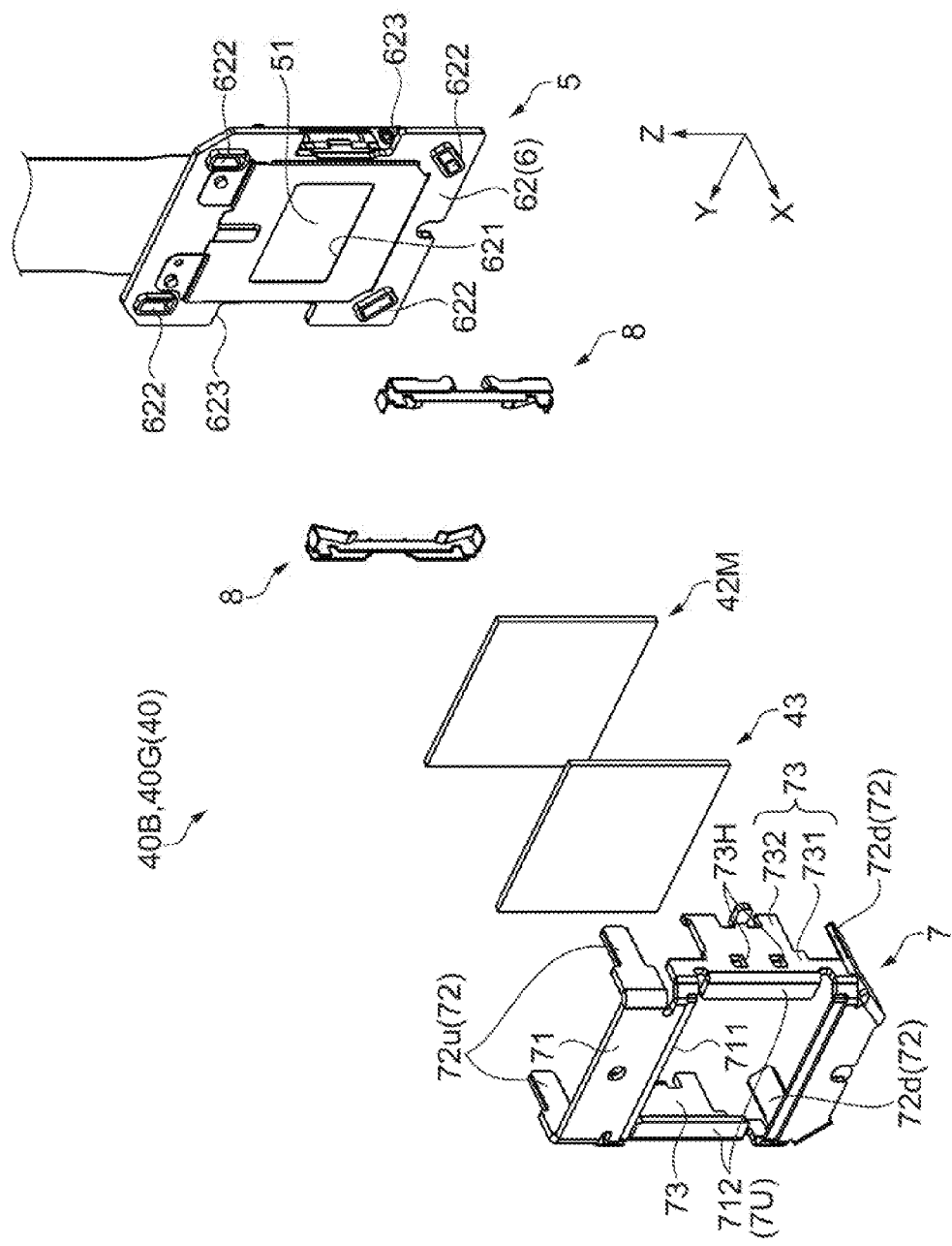
FIG. 4 is an exploded perspective view of the electro-optical device in the embodiment viewed from the light exiting side.

FIG. 3 is an exploded perspective view of the electro-optical devices 40B and 40G viewed from the light incident side. FIG. 4 is an exploded perspective view of the electro-optical devices 40B and 40G viewed from the light exiting side. In FIGS. 3 and 4, a light-incident-side polarizer 41, which will be described later, is omitted.

The electro-optical devices 40B and 40G each include the light modulator 5, a light-exiting-side polarizer 42M, a transparent substrate 43, a supporting section 7, clamping sections 8, and an adhesive (not shown) as a fixing member, as shown in FIGS. 3 and 4.

The electro-optical device 40R includes no transparent substrate 43 or clamping section 8 but includes a light-exiting-side polarizer 42Y, which differs from the light-exiting-side polarizer 42M. The light modulator 5 in the electro-optical device 40B is called a first light modulator 5B. The light modulator 5 in the electro-optical device 40G is called a second light modulator 5G. The light modulator 5 in the electro-optical device 40R is called a third light modulator 5R.

Light-incident-side polarizers 41 for the respective color light fluxes (see FIG. 1), each of which is an organic polarizer, receives the color light fluxes separated by the color separation system 33 and transmit the aligned polarized light produced by the polarization conversion element 323 but absorb polarized light different from the aligned polarized light, so that the Light-incident-side polarizers 41 output the aligned polarized light to the light modulators 5 for the respective color light fluxes. The light-incident-side polarizers 41 are each bonded to a glass plate (not shown) and supported by the optical part enclosure 38.

The light modulators 5 for the respective color light fluxes modulate the color light fluxes having exited out of the light-incident-side polarizers 41 for the respective color light fluxes in accordance with image information. Specifically, the first light modulator 5B modulates the B light having exited out of the light-incident-side polarizer 41 for B light, and the second light modulator 5G modulates the G light having exited out of the light-incident-side polarizer 41 for G light. The third light modulator 5R modulates the R light having exited out of the light-incident-side polarizer 41 for R light. The light modulators 5 will be described later in detail.

The light-exiting-side polarizer 42M for B light is disposed or the light exiting side of the first light modulator 5B, and the light-exiting-side polarizer 42M for G light is disposed on the light exiting side of the second light modulator 5G. The light-exiting-side polarizers 42M are each an inorganic polarizer formed, for example, of a quartz glass plate as a base member and have a rectangular shape in a plan view. Specifically, the light-exiting-side polarizers 42M each have a wire grid layer (not shown) which is disposed on one surface of the base member and in which a large number of minute linear ribs made, for example, of aluminum are arranged in parallel to one another. The light-exiting-side polarizers 42M each transmit polarized light polarized in the direction perpendicular to the direction in which the linear ribs extend (polarized light polarized in a fixed direction out of the color light outputted from the corresponding light modulator 5) but reflect polarized light polarized in the direction parallel to the direction in which the linear ribs extend. The light-exiting-side polarizers 42M are each so disposed that the wire grid layer thereof faces the corresponding light modulator 5.

The light-exiting-side polarizer 42Y for R light (see FIG. 1) is formed of an organic polarizer because the amount of heat generated therein is smaller than that in the light-exiting-side polarizers 42M for B light and G light. The light-exiting-side polarizer 42Y has roughly the same function as that of the light-incident-side polarizers 41 and transmits polarized light polarized in a fixed direction out of the R light outputted from the third light modulator 5R but absorbs polarized light different from the transmitted polarized light, so that the transmitted polarized light exits out of the light-exiting-side polarizer 42Y and travels to the cross dichroic prism 400. The light-exiting-side polarizer 42Y is bonded to a glass plate that is not shown and fixed to the corresponding supporting section 7 via an adhesive member.

An inorganic polarizer may instead be used as the light-exiting-side polarizer for R light, so that the electro-optical device 40R is configured in the same manner as the electro-optical devices 40B and 40G are configured. Further, all or part of the light-incident-side polarizers 41 for the respective color light fluxes may be inorganic polarizers.

The transparent substrates 43 each have a rectangular shape having roughly the same planar size as the planar size of the corresponding light-exiting-side polarizer 42M and are in contact with and layered on the light exiting side of the light-exiting-side polarizer 42M, that is, on the base member of the light-exiting-side polarizer 42M (one side of light-exiting-side polarizer 42M or the side opposite the wire grid layer). The transparent substrate 43 are each formed of a light transmissive plate, for example, a sapphire substrate having thermal conductivity higher than the thermal conductivity of the light-exiting-side polarizers 42M. As will be described below in detail, the transparent substrates 43 are so disposed as to be in contact with the light-exiting-side polarizers 42M and dissipate heat generated in the light-exiting-side polarizers 42M.

The supporting sections 7 support the light modulators 5 for the respective color light fluxes and are attached to the cross dichroic prism 400. The supporting sections 7 for the respective color light fluxes have the same shape.

The clamping sections 8 are provided on each of the electro-optical devices 40B and 40G, as described above, and engage with the corresponding supporting section 7. The clamping sections 8 and the supporting section 7 clamp the corresponding light-existing-side polarizer 42M and transparent substrate 43. The supporting section 7, the clamping sections 8, the light-exiting-side polarizer 42M, and the transparent substrate 43 are configured as a polarizer unit PU, in which the clamping sections 8 and the supporting section 7 clamp the light-exiting-side polarizer 42M and the transparent substrate 43. The supporting section 7 and the clamping sections 8 will be described later in detail.

The cross dichroic prism 400 is formed by bonding four rectangular prisms to each other and therefore has a roughly square shape in a plan view, and two dielectric multilayer films are formed along the interfaces between the bonded rectangular prisms. The cross dichroic prism 400 has three light-incident-side end surfaces and one light-exiting-side end surface. The electro-optical devices 40B, 40G, and 40R are so disposed as to face the three respective light-incident-side surfaces.

In the attitude in which the projector 1 is installed on a desktop or any other surface, the electro-optical devices 40R, 40G, and 40B are arranged in this order counterclockwise around the cross dichroic prism 400 when viewed from above (see FIG. 1). The cross dichroic priors 400 reflects the B light and the R light outputted from the electro-optical devices 40B and 40R and transmits the G light outputted from the electro-optical device 40G to combine the three modulated color light fluxes with one another.

The projection lens 36 includes a plurality of lenses (not shown) and enlarges and projects the light that is the combined light from the cross dichroic prism 400 and has exited out of the light-exiting-side end surface of the cross dichroic prism 400 on a projection surface SC such as a screen.

The cooler, although will not be described in detail, includes an intake fan that takes in outside air through the air intake port of the exterior enclosure, a duct member that guides the taken-in outside air to the optical apparatus 4 and other components, an exhaust fan that exhausts internal heated air through the air exhaust port of the exterior enclosure, and other components.

Configuration of Light Modulator

The light modulators 5 will now be described in detail.

The light modulators 5 each include a liquid crystal panel 51, a flexible substrate 52, and a holder 6, as shown in FIGS. 3 and 4.

The liquid crystal panel 51 is so formed that a liquid crystal material is encapsulated and sealed between a pair of transparent substrates and has a rectangular pixel area in which minute pixels that are not shown are formed in a matrix. The liquid crystal panel 51 includes a dustproof glass plate disposed on the surface of each of the pair of transparent substrates.

The flexible substrate 52 has one end connected to the liquid crystal panel 51 and the other end connected to the controller. In the liquid crystal panel 51, the liquid crystal orientation state is controlled in accordance with a drive signal inputted from the controller via the flexible substrate 52 so that a display image is formed in the pixel area.

In the following description, directions are defined as follows by focusing on one light modulator 5 for ease of description: The direction of a normal to the liquid crystal panel 51 (direction perpendicular to pixels in liquid crystal panel) is an X direction; the direction perpendicular to the X direction and extending from the liquid crystal panel 51 toward the flexible substrate 52 is a +Z direction; and the direction perpendicular to the X and Z directions is a Y direction (rightward/leftward direction). The side facing the light-exiting-side polarizer 42M of the light modulator 5 in the X direction is called a +X side, and the right side of the light modulator 5 when viewed from the light incident side with the +Z side being the upper side (see FIG. 3) is called a +Y side. The Z direction is the upward/downward direction in the attitude in which the projector 1 is installed on a desktop or any other surface, and the +Z side is the upper side. The Z direction corresponds to a first direction, and the Y direction corresponds to a second direction. The first direction is the direction extending along one edge of the rectangular light-exiting-side polarizer 42M.

The holder 6 includes a panel frame 61 and a fixing plate 62 and holds the liquid crystal panel 51, as shown in FIG. 3.

The panel frame 61 is made of a metal and formed in a rectangular shape in a plan view, and the liquid crystal panel 51 is disposed in a recess provided on the +X side of the panel frame 61. An opening 611 (see FIG. 3), through which light having passed through the light-incident-side polarizer 41 (see FIG. 1) travel, is formed in the bottom of the recess.

The fixing plate 62 is made of a metal, formed in a rectangular shape in a plan view, and disposed on the +X side of the panel frame 61, in which the liquid crystal panel 51 is accommodated. The fixing plate 62 is so formed as to be greater than the panel frame 61 in terms of planar size, and the panel frame 61, in which the liquid crystal panel 51 is disposed, is fixed to the fixing plate 62 with screws. The fixing plate 62 has an opening 621 (see FIG. 4) formed at the center thereof, and the light having passed through the liquid crystal panel 51 passes through the opening 621. Further, through holes 622 are formed at the four corners of the fixing plate 62. Cutouts 623 are formed in right and left end portions of the fixing plate 62 that are roughly central portions in the upward/downward direction.

Configuration of Supporting Sections and Clamping Sections

The supporting sections 7 will first be described.

The supporting sections 7 are provided on the electro-optical devices 40B, 40G, and 40R and have the same shape, as described above.

Each of the supporting sections 7 is formed of a metal sheet, is formed in a press working, and includes a base section 71, first supporting sections 72, and protruding sections 73, as shown in FIGS. 3 and 4.

The base section 71 is a portion to be attached to one of the light-incident-side end surfaces of the cross dichroic prism 400 and is formed in a rectangular shape in a plan view. A light passage opening 711, through which the light having exited out of the light-exiting-side polarizer 42M passes, is formed at the center of the base section 71. Rectangular overhangs 712, each of which is longer in the Z direction than in the Y direction, are provided along the right and left edges of the light passage opening 711. The overhangs 712 are located in positions shifted from the base section 71 toward the −X side, and adhesive members Ta, each of which is, for example, a double-sided tape, are disposed on the −X-side surfaces of the overhangs 712. The adhesive members Ta and the overhangs 712 function as a receiving section 7U, which receives the transparent substrate 43.

The first supporting sections 72 extend from the base section 71 and support the light modulator with play therebetween. That is, the light modulator 5 is so supported as to be positionally adjustable with respect to the supporting section 7.

The first supporting sections 72 are so formed that they bend at the four corners of the base section 71 by about 90° and extend toward the light modulator 5, as shown in FIG. 4, and front end portions of the first supporting sections 72 are so sized as to be inserted into the through holes 622 of the holder 6 with play, that is looseness in the rightward, leftward, upward, and downward directions between the front end portions and the through holes 622. More specifically, the first supporting sections 72 are formed of a pair of first supporting sections 72u, which protrude from the upper right and left corners of the base section 71, and a pair of first supporting sections 72d, which protrude from the lower right and left corners of the base section 71.

The protruding sections 73 bend at the right and left sides of the base section 71 and protrude toward the light modulator 5, as shown in FIGS. 3 and 4. The right and left protruding sections 73 are provided between the first supporting sections 72u and the first supporting sections 72d. The protruding sections 73 each have a wide section 731, which is formed on the side facing the base section 71, and an extension section 732, which has an upward/downward dimension smaller than of the wide section 731 and has upper and lower steps with respect to the wide section 731.

The extension sections 732 extend in such a way that they are inserted through the cutouts 623 of the light modulator 5. Projections 733 are formed at front end portions of the right and left extension sections 732, specifically, at the centers of front end portions in the upward/downward direction, and the projections 733 bend in the direction in which they face away from each other.

Two insertion holes 73H, each of which has a rectangular shape in a plan view and which are arranged in the upward;

downward direction, are formed in each of the protruding sections 73 and in positions close to the base section 71.

The clamping sections 8 will next be described in detail.

The clamping sections 8 are provided on each of the electro-optical devices 40B and 40G, as described above.

A pair of clamping sections 8 are arranged in the Y direction (second direction, rightward/leftward direction) and disposed on opposite sides of the light-exiting-side polarizer 42M and the transparent substrate 43 and clamp, along with the supporting section 7, the light-exiting-side polarizer 42M and the transparent substrate 43, as shown in FIGS. 3 and 4. The upper and lower portions of each of the clamping sections 8 have a shape symmetric shape, and the right and left clamping sections 8 have the same shape.

Figure 5:
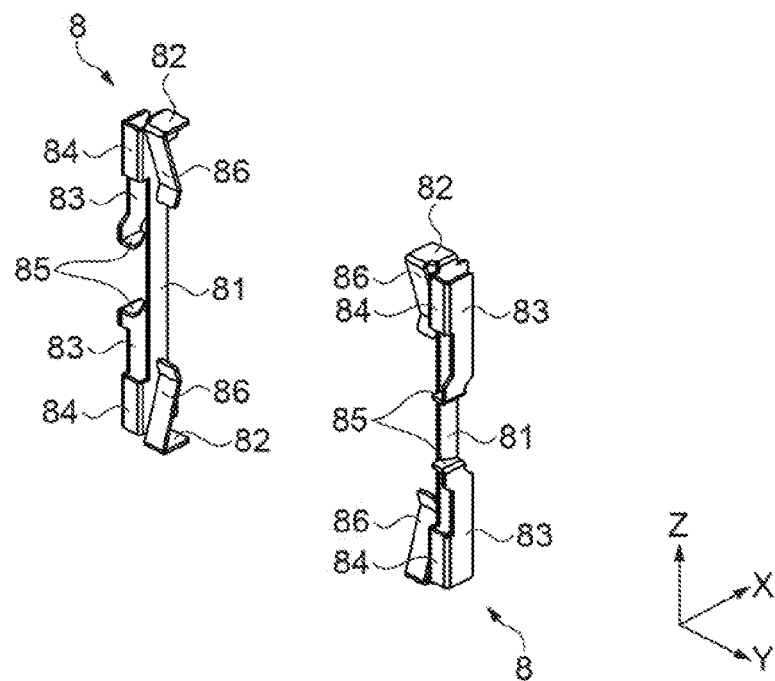
FIG. 5 is a perspective view showing clamping sections in the embodiment.
Figure 6:
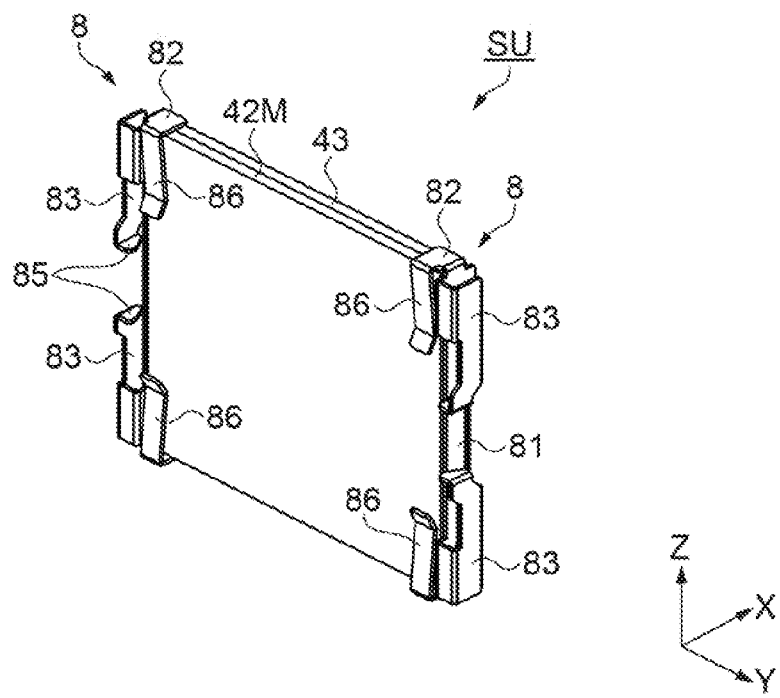
FIG. 6 is a perspective view of a sub-unit in the embodiment viewed from the light incident side.
Figure 7:
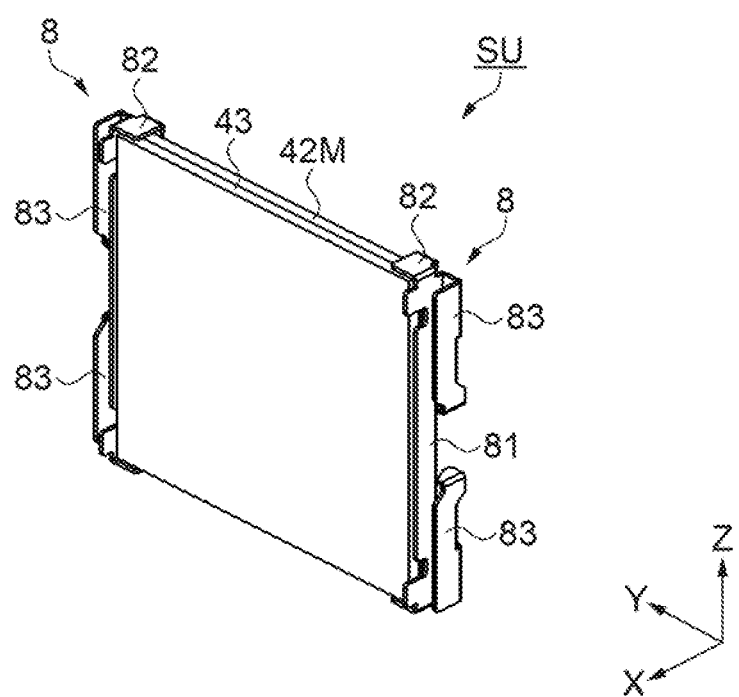
FIG. 7 is a perspective view of the sub-unit in the embodiment viewed from the light exiting side.

FIG. 5 is a perspective view showing the right and left clamping sections 8. FIG. 6 is a perspective view of the state in which the right and left clamping sections 8 are disposed on the light-exiting-side polarizer 42M and the transparent substrate 43 (the right and left clamping sections 8, the light-exiting-side polarizer 42M, and the transparent substrate 43 in this state are called a "sub-unit SU") and which is viewed from the light incident side. FIG. 7 is a perspective view of the sub-unit SU viewed from the light exiting side.

Each of the clamping sections 8 is formed of a metal sheet, is formed in press working, and includes a first plate-shaped section 81, second plate-shaped sections 82, third plate-shaped sections 83, connection sections 84, bent sections 85, and urging sections 86, as shown in FIG. 5.

The first plate-shaped section 81 has an elongated shape that is longer in the Z direction than in the X direction and extends along one of the right and left (Y-direction-side) end surfaces of the light-exiting-side polarizer 42M and the transparent substrate 43, as shown in FIGS. 6 and 7.

The second plate-shaped sections the third plate-shaped sections 83, the connection sections 84, the bent sections 85, and the urging sections 86 are each provided as a pair and provided at upper and lower portions of the first plate-shaped section 81.

Specifically, the second plate-shaped sections 82 are bent at opposite longitudinal ends (Z-direction-side ends) of the first plate-shaped section 81, have flat surfaces arranged in the upward/downward direction and facing opposite end surfaces of the light-exiting-side polarizer 42M and the transparent substrate 43, and are so formed that the flat surfaces are allowed to come into contact with the opposite end surfaces, as shown in FIGS. 6 and 7. That is, the second plate-shaped sections 82 restrict movement of the light-exiting-side polarizer 42M and the transparent substrate 43 in the upward/downward direction (Z direction)

The third plate-shaped sections 83 are linked to the first plate-shaped section 81 via the connection sections 84.

The connection sections 84 are provided in the vicinity of the upward/downward ends of the first plate-shaped section 81 and bent at −X-side end portions of the first plate-shaped section 81. The third plate-shaped sections 83 are bent at the ends of the connection sections 84 toward the +X side and so disposed as to face the first plate-shaped section 81 with a predetermined gap between the third plate-shaped sections 83 and the first plate-shaped section 81. The predetermined gap is a gap into which each of the protruding sections 73 (see FIG. 3) of the supporting section 7 can be inserted. The pair of third plate-shaped sections 83 extend in the direction in which they approach each other and are each so formed as to serve as a plate spring shape having a fixed end facing the connection section 84.

The bent sections 85 are provided at the front ends of the third plate-shaped sections 83, are bent toward the first plate-shaped section 81, and correspond to an engaging section. The bent sections 85 are so formed that when the corresponding wide section 731 is inserted into the space between the first plate-shaped section 81 and the third plate-shaped sections 83, the bent sections 85 are inserted into the insertion holes 73H and engage with the circumferential edges of the insertion holes 73H.

The urging sections 86 are bent at the −X-side ends of the second plate-shaped sections 82 and each form a spring having a fixed end that is the −X-side end. The pair of urging sections 86 extend in the Z direction (first direction) in such a way that they approach each other and bend in such a way that the front ends thereof come into contact with the light-exiting-side polarizer 42M as shown in FIG. 6. The four urging sections 86 of the right and left clamping section 8 are so formed as to come into contact with the light-exiting-side polarizer 42M, specifically portions in the vicinity of the four corners of the light-exiting-side polarizer 42M.

Figure 8:
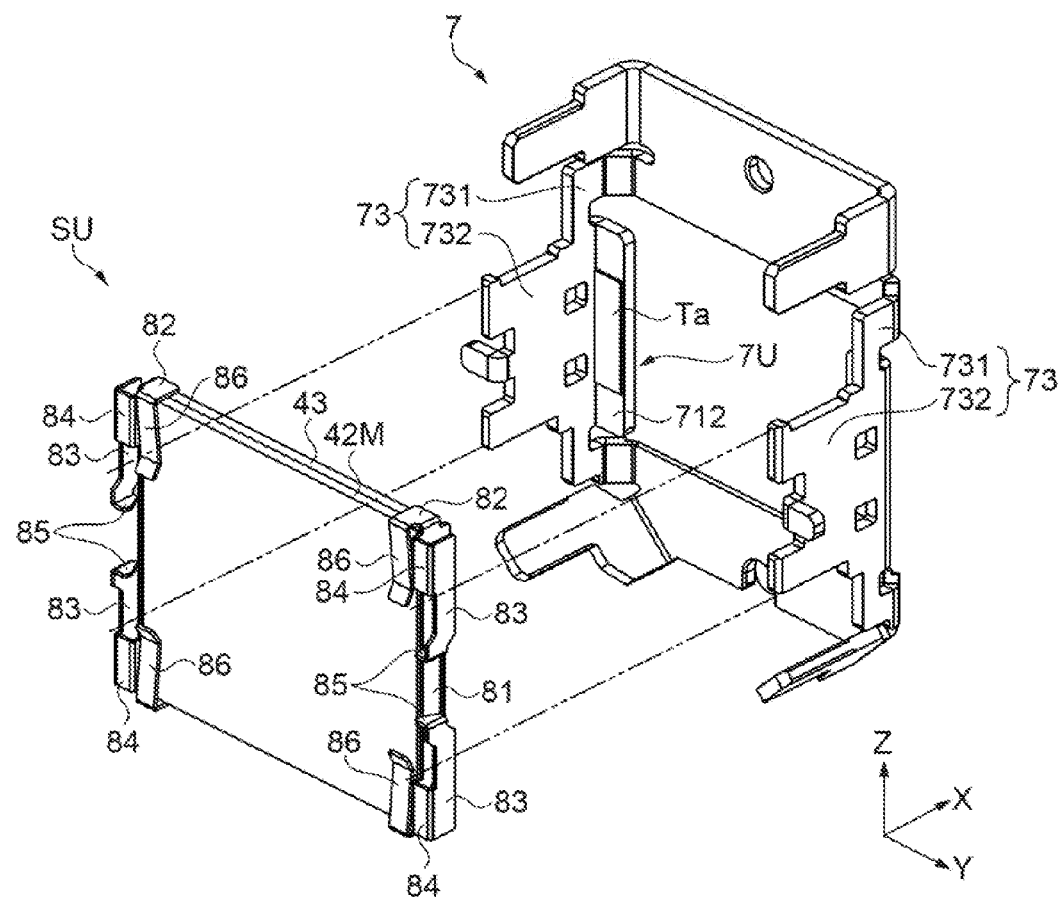
FIG. 8 is a perspective view of the sub-unit and a supporting section in the embodiment.
Figure 9:
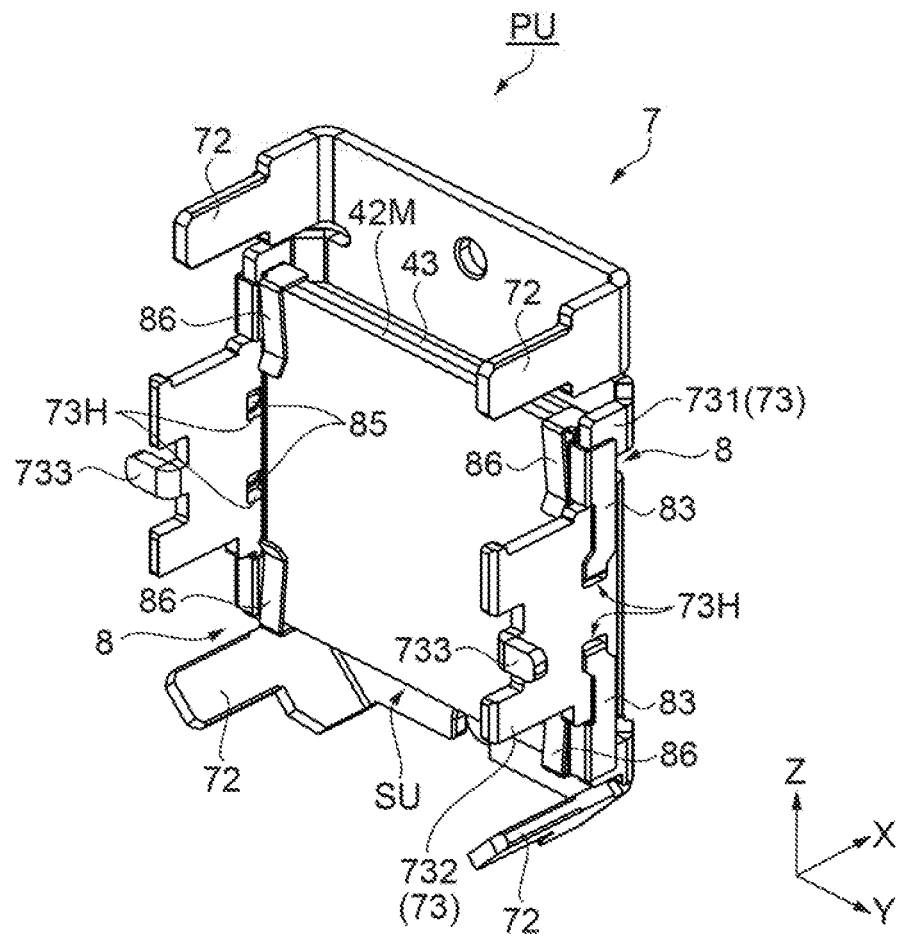
FIG. 9 is a perspective view of a polarizer unit in the embodiment.
Figure 10:
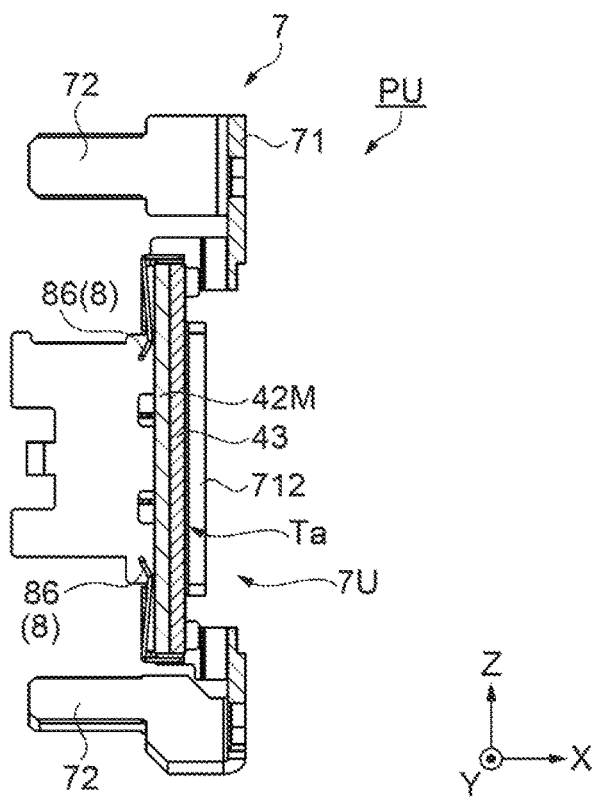
FIG. 10 is a cross-sectional view of the polarizer unit in the embodiment.

A method form assembling each of the polarizer units PU will now be described with reference to FIGS. 8 to 10. FIG. 8 is a perspective view of the sub-unit SU and the supporting section 7. FIG. 9 is a perspective view of the polarizer unit PU. FIG. 10 is a cross-sectional view of the polarizer unit PU.

First, the pair of clamping sections 8 are disposed in predetermined positions on a jig that is not shown, and the light-exiting-side polarizer 42M and the transparent substrate 43 are layered on the jig in this order to form the sub-unit SU (see FIG. 8) In FIG. 8, the jig described above is omitted, and the polarizer unit PU is drawn in an upright position to readily allow visual recognition of the components of the polarizer unit PU.

The extension sections 732 of the supporting section are then each inserted into the space between the corresponding first plate-shaped section 81 and third plate-shaped sections 83 of the sub-unit SU and between the upper and lower connection sections 84 of the corresponding clamping section 8, as shown in FIG. 8.

The bent sections 85 of the third plate-shaped sections 83 bend toward the first plate-shaped section 81. Therefore, when the extension sections 732 are inserted, the bent sections 85 are pressed by the extension sections 732 and yield in the direction in which the bent sections 85 move away from the first plate-shaped section 81 (not shown).

When the extension sections 732 are further inserted, the wide sections 731 are each inserted into the space between the corresponding first plate-shaped section 81 and third plate-shaped sections 83. Since the third plate-shaped sections 83 each act as a spring, the bent sections 85 are inserted into the insertion holes 73H in predetermined positions, and the clamping sections 8 engage with the supporting section 7. The light-exiting-side polarizer 42M and the transparent substrate 43 are clamped between the urging sections 86 and the receiving section 7U, as shown in FIGS. 9 and 10. The polarizer unit PU is thus assembled.

Since the adhesive Ta is present between the transparent substrate 43 and the overhangs 712 as shown in FIG. 10, the light-exiting-side polarizer 42M and the transparent substrate 43 are so disposed as to be well protected from vibration and impact. Further, in the polarizer unit PU, the plate-shaped portions (first plate-shaped sections 81, protruding sections 73, and third plate-shaped sections 83) jut out beyond the light-exiting-side polarizer 42M and the transparent substrate 43 in the rightward/leftward direction. That is, the polarizer unit PU is so configured that the amount of portions that jut out beyond the light-exiting-side polarizer 42M and the transparent substrate 43 in the rightward/leftward direction is small.

As described above, with respect to the light-exiting-side polarizer 42M and the transparent substrate 43, the receiving section 7U is provided on the side facing the base section 71, and the urging sections 86 are provided on the side opposite the base section 71. When the bent sections 85 engage with the supporting section 7, the urging sections 86 urge the light-exiting-side polarizer 42M toward the transparent substrate 43, and the receiving section 7U receives the transparent substrate 43 pressed by the urging sections 86. The urging sections 86 urge portions in the vicinity of the four corners the light-exiting-side polarizer 42M.

The first light modulator 5B is supported by the first supporting sections 72 of the supporting section 7 in the corresponding polarizer unit PU with play between the first light modulator 5B and the first supporting sections 72 (the first light modulator 5B and the polarizer unit PU in this state is referred to as an "adjusted unit"). The position of the adjusted unit is then adjusted by using a first jig that grasps the first light modulator 5B and a second jig that can engage with the projections 733 (neither of the jigs is shown).

Specifically, the adjusted unit is disposed in a temporary position with respect to the cross dichroic prism 400 with the first light modulator 5B grasped by the first jig and the projections 733 engaging with the second jig.

After the position of the first light modulator 5B is adjusted by moving the first jig, the first light modulator 5B is fixed to the first supporting sections 72 with an adhesive as a fixing member. The first jig is then removed, and the position of the unit to which the first light modulator 53 has been fixed is adjusted with respect to the cross dichroic prism 400 by using the second jig. The positionally adjusted unit is then glued and fixed to the cross dichroic prism 400.

An adjusted unit in which the second light modulator 5G is supported with play is adjusted in terms of position thereof in the same manner in accordance with which the adjusted unit in which the first light modulator 5B is supported with play is adjusted in terms of position.

The third light modulator 5R is supported with play by the supporting section 7 to which the light-exiting-side polarizer 42Y has been fixed, and the position of the third light modulator 5R is adjusted in the same method described above.

The optical apparatus 4 is assembled with the positions of the light modulators 5 for the respective color light fluxes adjusted, as described above. Further, the optical apparatus 4 is cooled by air sent from the cooler that is not shown and flowing from above to below. The light-exiting-side polarizer 42M and the transparent substrate 43, which is in contact with the light-exiting-side polarizer 42M and dissipates heat therefrom, are also cooled by the air delivered from the cooler.

As described above, according to the projector 1 of the present embodiment, the following advantageous effects are provided.

(1) Each of the light-exiting-side polarizers 42M, which is formed of an inorganic polarizer, and the corresponding transparent substrate 43 are clamped between the urging sections 86 and the receiving section 7U when the clamping sections 8 engage with the supporting section 7. That is, the supporting sections 7, which support the first light modulator 5B and the second light modulator 5G, can each be used to maintain the state in which the light-exiting-side polarizer 42M is in contact with the transparent substrate 43. The configuration in which the light-exiting-side polarizer 42M is in contact with the transparent substrate 43 can therefore be achieved with use of no adhesive and an increase in the number of parts suppressed. An optical apparatus 4 that can be readily manufactured and allows efficient dissipation of heat in the light-exiting-side polarizers 42M, which generate heat when high-luminance color light fluxes are incident thereon, can therefore be provided.

The heat generated in the light-exiting-side polarizer 42M is moved to the transparent substrate 43, which is in contact with the light-exiting-side polarizer 42M, and transferred from the transparent substrate 43 to the first plate-shaped sections 81, the second plate-shaped sections 82, or the urging sections 86 of the clamping sections 8. The heat transferred to the clamping sections 8 is transferred to the supporting section 7 (protruding sections 73) via the first plate-shaped sections 81, the third plate-shaped sections 83, the connection sections 84, or the bent sections 85, whereby the heat in the light-exiting-side polarizer 42M, which generates heat when a high-luminance color light flux is incident thereon, can be efficiently dissipated.

(2) In each of the polarizer units PU, the clamping sections 8 each have a pair of urging sections 86 in the Z direction, and the pair of urging sections 86 are arranged in the Y direction and provided on opposite sides of the light-exiting-side polarizer 42M and the transparent substrate 43. The light-exiting-side polarizer 42M and the transparent substrate 43 are so sandwiched that the pair of urging sections 86 sandwich portions in the vicinity of the four corners of the light-exiting-side polarizer 42M. As a result, the light-exiting-side polarizer 42M and the transparent substrate 43 are allowed to be in contact with each other over a wide area, whereby the heat in the light-exiting-side polarizer 42M can be more efficiently dissipated.

(3) Each of the light-exiting-side polarizers 42M and the corresponding transparent substrate 43 are so supported that the opposite sides thereof in the Y direction are supported by the first plate-shaped sections 81 of the pair of clamping sections 8 and the opposite sides thereof in the Z direction are supported by the second plate-shaped sections 82 of each of clamping sections 8. Each of the clamping sections 8 is formed of a metal sheet and has the first plate-shaped section 81, the second plate-shaped sections 82, the third plate-shaped sections 83, and the urging sections 86 integrated with one another. Therefore, the light-exiting-side polarizer 42M and the transparent substrate 43 can be supported in the in-plane direction (Y and Z directions) and the light-exiting-side polarizer 42M can be urged toward the transparent substrate 43 by using simple parts.

(4) Each of the polarizer units PU can be assembled by simply disposing the clamping sections 8 on opposite sides of the light-exiting-side polarizer 42M and the transparent substrate 43 and inserting each of the protruding sections 73 into the space between the first plate-shaped section 81 and the third plate-shaped sections 83. The manufacture of the polarizer unit PU can therefore be simplified.

(5) Since each of the polarizer units PU is so configured that the plate-shaped portions of the supporting section 7 and the clamping sections 8 jut out beyond the light-exiting-side polarizer 42M and the transparent substrate 43 in the Y direction, that is, so configured that the amount of portion jutting out beyond the light-exiting-side polarizer 42M and the transparent substrate 43 is small, the size of the polarizer unit PU in the Y direction can be reduced. The size of each of the electro-optical devices 40B and 40G in the Y direction can therefore be reduced. Further, since the electro-optical device 40R includes no clamping section 8 but includes the common supporting section 7, the size of the electro-optical device 40R in the Y direction can be reduced. It is therefore possible to reduce the size of the optical apparatus 4, arrange a member between adjacent electro-optical devices 40, or provide a space for cooling.

(6) Since the optical apparatus 4 is so configured that the positions of the light modulators 5 for the respective color light fluxes can be adjusted, light having suppressed pixel shift can be outputted.

(7) Each of the light-exiting-side polarizers 42M has the wire-grid layer and is so disposed that the wire-grid layer faces the light modulator 5. The transparent substrate 43 is in contact with one side of the light-exiting-side polarizer 42M, the side opposite the wire-grid layer. That is, the light-exiting-side polarizers 42M are each so configured that the light outputted from the light modulator 5 is directly incident on the wire-grid layer. The amount of refraction and other optical behavior of the light outputted from the light modulator 5 that occur until the light reaches the wire-gird layer can be reduced as compared with a configuration in which a member is disposed between the light modulator 5 and the wire-grid layer (a configuration in which the light is incident through the side opposite the wire-grid layer and a configuration in which the light passes through the transparent substrate 43 and the light-exiting-side polarizer 42M in this order). The optical apparatus 4 can therefore output light having suppressed color unevenness and other disadvantages.

(8) The projector 1, which includes the optical apparatus 4 described above, can project a bright, high-quality image, and the size of the projector 1 can be reduced.

The invention, is not limited to the embodiment described above, and a variety of changes, improvements, and other modifications can be made to the embodiment described above. Variations of the embodiment will be described below.

Variation 1

The polarizer units may each be configured to include an optical element (for example, compensation element that compensates optical retardation, a retardation film, and other optical elements) provided on the light exiting side of the light-exiting-side polarizer 42M.

Figure 11:
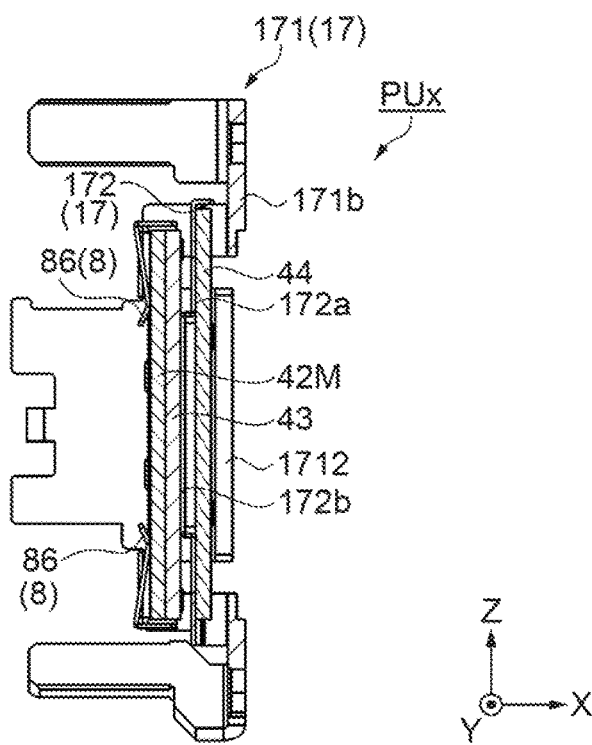
FIG. 11 is a cross-sectional view of a polarizer unit in a variation.

FIG. 11 is a cross-sectional view of a polarizer unit PUx in Variation 1.

The polarizer unit PUx includes a supporting section 17, which differs from each of the supporting sections 7 in the embodiment described above, and further includes a retardation film 44 as an optical element disposed on the light exiting side of the transparent substrate 43, as shown in FIG. 11.

The supporting section 17 has a body member 171 and an auxiliary member 172. The body member 171 has a shape similar to the shape of the supporting sections 7 in the embodiment described above. The body member 171 has overhangs 1712 (see FIG. 11), which are formed in positions shifted from the overhangs 712 (see FIG. 10) of the supporting section 7 toward a base section 171*b*.

The auxiliary member 172 is formed of a metal sheet and is disposed between the transparent substrate 43 and the retardation film 44, as shown in FIG. 11. The auxiliary member 172 has a first flat section 172*a*, which comes into contact with an edge portion of the light-incident-side surface of the retardation film 44 via an adhesive (not shown), and a second flat section 172*b*, which protrudes beyond the first flat section 172*a* toward the transparent substrate 43 and receives the transparent substrate 43 via an adhesive (not shown). An opening through which the light having passed through the light-exiting-side polarizer 42M and the transparent substrate 43 passes is provided in the second flat section 172*b*.

The polarizer unit PUx is assembled by placing the auxiliary member 172, to which the retardation film 44 has been attached, on the sub-unit SU and inserting the body section 171 into the clamping sections 8, as in the embodiment described above. The light-exiting-side polarizer 42M and the transparent substrate 43 are clamped between the urging sections 86 and the second flat section 172*b*. The auxiliary member 172 corresponds to a second supporting section that supports the retardation film 44, and the second flat section 172*b* on which the adhesive is disposed corresponds to a receiving section.

The configuration of Variation 1 can provide an optical apparatus 4 that outputs light that excels in the contrast ratio, characteristics of the angular field of view, and other factors while maintaining the configuration in which the light-exiting-side polarizer 42M and the transparent substrate 43 are clamped.

Further, the heat generated in the light-exiting-side polarizer 42M is moved to the transparent substrate 43, which is in contact with the light-exiting-side polarizer 42M, and transferred from the transparent substrate to the first plate-shaped sections 81, the second plate-shaped sections 82, or the urging sections 86 of the clamping sections 8. The heat transferred to the clamping sections 8 is transferred to the supporting section 17 via the first plate-shaped sections 81, the third plate-shaped sections 83, the connection sections 84, or the bent sections 85, whereby the heat in the light-exiting-side polarizer 42M, which generates heat when a high-luminance color light flux is incident thereon, can be efficiently dissipated.

Variation 2

In the embodiment described above, the first color light is B light. The first color light may instead be any color light other than B light, for example, G light.

Variation 3

In the embodiment described above, the clamping sections 8 urge the light-exiting-side polarizer 42M, and the supporting section 7 receives the transparent substrate 43. Instead, the clamping sections 8 may urge the transparent substrate 43, and the supporting section 7 may receive the light-exiting-side polarizer 42M.

Variation 4

The receiving sections 71J in the embodiment described above each include adhesive member Ta. Overhangs 712 each of which includes no adhesive member Ta may be configured as the receiving section.

Variation 5

The optical apparatus 4 in the embodiment described above employs what is called a three-panel method including the three light modulators 5 corresponding to the R light, the G light, and the B light, but not necessarily. The invention is also applicable to an optical apparatus including two light modulators or four or more light modulators In the embodiment described above, the light modulators 5 each including the transmissive liquid crystal panel 51 are supported by the respective supporting sections 7. The invention is also applicable to a configuration in which light modulators each including a reflective liquid crystal panel are supported by respective supporting sections.

Variation 6

The light source apparatus 31 in the embodiment described above employs the discharge-type light source 311 and may instead be formed of a light source based on a different method or a light emitting diode, a laser diode, or any other solid-state light source.

The present application claims priority based on Japanese Patent Application No. 2016-139150 filed on Jul. 14, 2016, and the entire contents described in the application are incorporated in the present application.

What is claimed is:

1. An optical apparatus including a first light modulator that modulates first color light, a second light modulator that modulates second color light, and a light combining optical apparatus that combines color light fluxes modulated by the first and second light modulators with each other, the optical apparatus comprising:
   an inorganic polarizer disposed on a light exiting side of the first light modulator;
   a transparent substrate that is in contact with the inorganic polarizer and transmits light;
   a supporting section that supports the first light modulator and is attached to the light combining optical apparatus; and
   a clamping section that clamps, along with the supporting section, the inorganic polarizer and the transparent substrate,
   wherein the clamping section includes:
      an engaging section that engages with the supporting section, and
      an urging section that urges and contacts one of the inorganic polarizer and the transparent substrate toward the other of the inorganic polarizer and the transparent substrate when the engaging section engages with the supporting section,
   the supporting section has a receiving section that receives the other of the inorganic polarizer and the transparent substrate pressed by the urging section,
   the inorganic polarizer is formed in a rectangular shape in a plan view,
   a direction extending along one edge of the inorganic polarizer is called a first direction, and a direction that intersects the first direction and extends along a surface of the inorganic polarizer is called a second direction,
   the clamping section has a first plate-shaped section extending along an end surface that is a surface of the one of the inorganic polarizer and the transparent substrate and faces in the second direction, and
   the clamping section has a pair of second plate-shaped sections that bend at opposite ends of the first plate-shaped section that are located along the first direction and restrict movement of the inorganic polarizer and the transparent substrate in the first direction.

2. The optical apparatus according to claim 1, wherein the urging section has a pair of urging sections extending in the first direction in such a way that the pair of urging sections approach each other, and
   the pair of urging sections are bent portions of the pair of second plate-shaped sections.

3. The optical apparatus according to claim 1, wherein the supporting section has a first supporting section that supports the first light modulator with play therebetween, and the first light modulator and the first supporting section are fixed to each other via a fixing member.

4. The optical apparatus according to claim 1, wherein the inorganic polarizer has a base member and a wire-grid layer formed on one surface of the base member, with the wire-gird layer and the first light modulator so disposed as to face each other, and
   the transparent substrate is in contact with a side of the inorganic polarizer that is opposite a side where the wire-gird layer is present.

5. A projector comprising:
   a light source;
   the optical apparatus according to claim 1 on which light emitted from the light source is incident; and
   a projection optical apparatus that projects light outputted from the optical apparatus.

6. An optical apparatus including a first light modulator that modulates first color light, a second light modulator that modulates second color light, and a light combining optical apparatus that combines color light fluxes modulated by the first and second light modulators with each other, the optical apparatus comprising:
   an inorganic polarizer disposed on a light exiting side of the first light modulator;
   a transparent substrate that is in contact with the inorganic polarizer and transmits light;
   a supporting section that supports the first light modulator and is attached to the light combining optical apparatus; and
   a clamping section that clamps, along with the supporting section, the inorganic polarizer and the transparent substrate,
   wherein the clamping section includes:
      an engaging section that engages with the supporting section, and
      an urging section that urges one of the inorganic polarizer and the transparent substrate toward the other of the inorganic polarizer and the transparent substrate when the engaging section engages with the supporting section,
   the supporting section has a receiving section that receives the other of the inorganic polarizer and the transparent substrate pressed by the urging section,
   the inorganic polarizer is formed in a rectangular shape in a plan view,
   a direction extending along one edge of the inorganic polarizer is called a first direction, and a direction that intersects the first direction and extends along a surface of the inorganic polarizer is called a second direction,
   the clamping section has a first plate-shaped section extending along an end surface that is a surface of the one of the inorganic polarizer and the transparent substrate and faces in the second direction, and
   the clamping section has a pair of second plate-shaped sections that bend at opposite ends of the first plate-shaped section that are located along the first direction and restrict movement of the inorganic polarizer and the transparent substrate in the first direction.

7. The optical apparatus according to claim 6, wherein the urging section has a pair of urging sections extending in the first direction in such a way that the pair of urging sections approach each other, and
   the pair of urging sections are bent portions of the pair of second plate-shaped sections.

8. An optical apparatus including a first light modulator that modulates first color light, a second light modulator that modulates second color light, and a light combining optical apparatus that combines color light fluxes modulated by the first and second light modulators with each other, the optical apparatus comprising:
   an inorganic polarizer disposed on a light exiting side of the first light modulator;
   a transparent substrate that is in contact with the inorganic polarizer and transmits light;

a supporting section that supports the first light modulator
and is attached to the light combining optical apparatus;
and
a clamping section that clamps, along with the supporting section, the inorganic polarizer and the transparent substrate,
wherein the clamping section includes:
an engaging section that engages with the supporting section, and
an urging section that urges and contacts one of the inorganic polarizer and the transparent substrate toward the other of the inorganic polarizer and the transparent substrate when the engaging section engages with the supporting section,
the supporting section has a receiving section that receives the other of the inorganic polarizer and the transparent substrate pressed by the urging section,
the inorganic polarizer is formed in a rectangular shape in a plan view,
a direction extending along one edge of the inorganic polarizer is called a first direction, and a direction that intersects the first direction and extends along a surface of the inorganic polarizer is called a second direction,
the clamping section has a first plate-shaped section, extending along an end surface that is a surface of the one of the inorganic polarizer and the transparent substrate, and faces in the second direction,
the clamping section has a third plate-shaped section so disposed as to face the first plate-shaped section with a predetermined gap therebetween and as to be connected to the first plate-shaped section,
the engaging section has a bent section that is provided at a front end of the third plate-shaped section and bends toward the first plate-shaped section,
the supporting section includes
a base section attached to the light combining optical apparatus, and
a protruding section that protrudes from the base section and is inserted into a space between the first plate-shaped section and the third plate-shaped section,
an insertion hole with which the bent section engage is formed in the protruding section,
the receiving section is provided on a side facing the base section with respect to the inorganic polarizer and the transparent substrate, and
the urging section is provided on a side opposite the base section with respect to the inorganic polarizer and the transparent substrate.

9. An optical apparatus including a first light modulator that modulates first color light, a second light modulator that modulates second color light, and a light combining optical apparatus that combines color light fluxes modulated by the first and second light modulators with each other, the optical apparatus comprising:
an inorganic polarizer disposed on a light exiting side of the first light modulator;
a transparent substrate that is in contact with the inorganic polarizer and transmits light;
a supporting section that supports the first light modulator and is attached to the light combining optical apparatus; and
a clamping section that clamps, along with the supporting section, the inorganic polarizer and the transparent substrate,
wherein the clamping section includes:
an engaging section that engages with the supporting section, and
an urging section that urges and contacts one of the inorganic polarizer and the transparent substrate toward the other of the inorganic polarizer and the transparent substrate when the engaging section engages with the supporting section,
the supporting section has a receiving section that receives the other of the inorganic polarizer and the transparent substrate pressed by the urging section,
the inorganic polarizer has a rectangular shape in a plan view,
a direction extending along one edge of the inorganic polarizer is called a first direction, and a direction that intersects the first direction and extends along a surface of the inorganic polarizer is called a second direction, and
the clamping section has a pair of clamping sections provided on a side facing the one edge and on a side facing another edge separate from the one edge in the second direction.

10. An optical apparatus including a first light modulator that modulates first color light, a second light modulator that modulates second color light, and a light combining optical apparatus that combines color light fluxes modulated by the first and second light modulators with each other, the optical apparatus comprising:
an inorganic polarizer disposed on a light exiting side of the first light modulator;
a transparent substrate that is in contact with the inorganic polarizer and transmits light;
a supporting section that supports the first light modulator and is attached to the light combining optical apparatus; and
a clamping section that clamps, along with the supporting section, the inorganic polarizer and the transparent substrate,
wherein the clamping section includes:
an engaging section that engages with the supporting section, and
an urging section that urges one of the inorganic polarizer and the transparent substrate toward the other of the inorganic polarizer and the transparent substrate when the engaging section engages with the supporting section,
the supporting section has a receiving section that receives the other of the inorganic polarizer and the transparent substrate pressed by the urging section,
the inorganic polarizer is formed in a rectangular shape in a plan view,
a direction extending along one edge of the inorganic polarizer is called a first direction, and a direction that intersects the first direction and extends along a surface of the inorganic polarizer is called a second direction,
the clamping section has a first plate-shaped section extending along an end surface that is a surface of the one of the inorganic polarizer and the transparent substrate and faces in the second direction,
the clamping section has a third plate-shaped section so disposed as to face the first plate-shaped section with a predetermined gap therebetween and as to be connected to the first plate-shaped section,
the engaging section has a bent section that is provided at a front end of the third plate-shaped section and bends toward the first plate-shaped section,
the supporting section includes a base section attached to the light combining optical apparatus, and a protruding section that protrudes from the base section and is inserted into a space between the first plate-shaped section and the third plate-shaped section, an insertion hole with which the bent section engage is formed in the protruding section, the receiving section is provided on a side facing the base section with respect to the inorganic polarizer and the transparent substrate, and the urging section is provided on a side opposite the base section with respect to the inorganic polarizer and the transparent substrate.

* * * * *